May 23, 1961 D. D. KALEN 2,984,995
MODIFIED BALL AND SOCKET COUPLING
Filed May 13, 1960
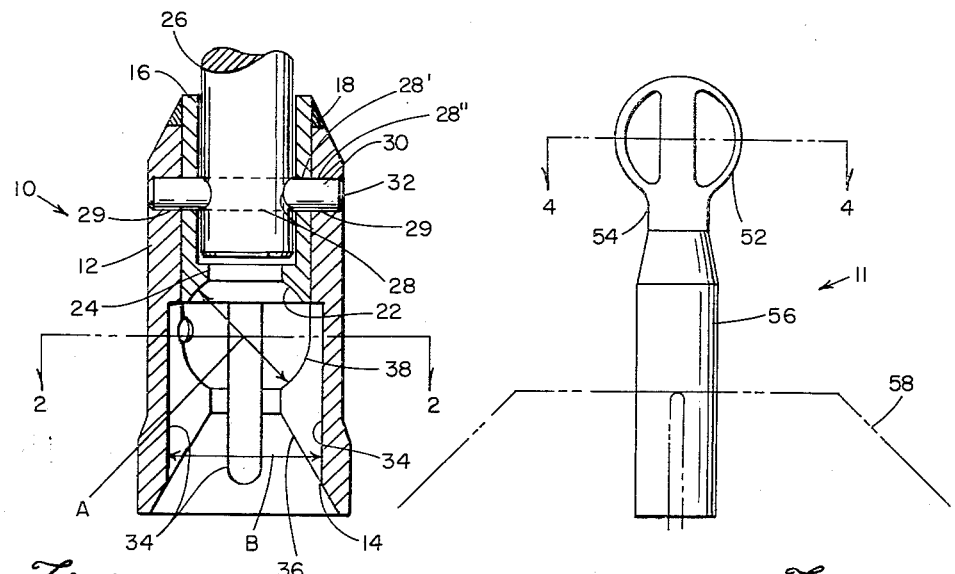
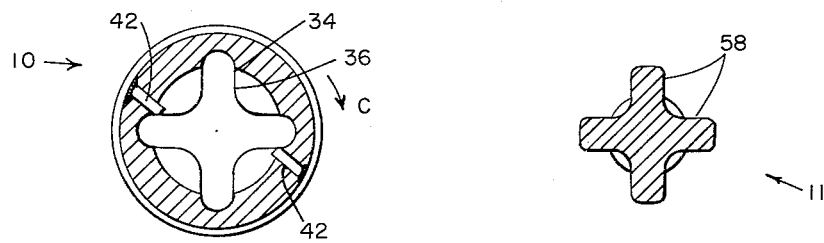
INVENTOR.
DAVID D. KALEN
BY
Roland A. Anderson
Attorney

United States Patent Office 2,984,995
Patented May 23, 1961

2,984,995

MODIFIED BALL AND SOCKET COUPLING

David D. Kalen, Lynchburg, Va., assignor to the United States of America as represented by the United States Atomic Energy Commission Filed May 13, 1960, Ser. No. 29,123

4 Claims. (Cl. 64—7)

The present invention relates to modified ball and socket coupling apparatus and more particularly to a modified ball and socket coupling in which the features of engagement without visual aid and ability to pick up axial and angular misalignments are combined.

In certain types of nuclear reactors, control is exercised through the adjustable movement of control rods which are withdrawn or inserted in accordance with operating conditions. The control rods are usually vertically mounted, that is, they extend through the top of the reactor into the internals and their movement is caused by a control drive mechanism mounted above the reactor and extending down to engage the top of the rods. During assembly of the reactor it is not feasible to connect the control rods to the shafts extending down from the drive mechanisms. This connection is made after the internals including the control rods have been assembled within the pressure vessel and the head of the pressure vessel has been secured. In effect, this requires that this connection must be accomplished without any visual aid whatsoever. It also means that the initial engagement must compensate for any slight axial and angular misalignments of the control drive mechanism shafts and the control rods as well. The engagement should also occur without damaging or otherwise interfering with the movement of the control rods within the reactor. Another limitation usually imposed arises out of the fact that the drive mechanism is oriented along a particular angle or in increments of some angle such as 90°, so that the coupling apparatus must be capable of being designed to fit in with this orientation.

Ball and socket coupling arrangements, as known in the art, are generally suitable for use in coupling situations where it is necessary to accommodate angular misalignments of the members joined together. However, ball and socket couplings capable of engaging where there are slight axial and radial misalignments as well as a locking of the parts with no visual aid and suitable generally for use under the conditions hereinabove set forth are not found in the art. To meet these requirements I have invented a modified ball and socket arrangement which is particularly suitable for this application. In accordance with this invention, the coupling utilizes a modified ball construction involving spherical segments which pass through appropriate slots in the socket member before engagement is completed by rotation of the socket. Provision is made for axial and angular misalignments of the two members and for insuring that the engagement is positive and complete.

It is accordingly a first object of this invention to provide modified ball and socket coupling arrangements for making engagement without visual aid.

A further object of this invention is provision of a ball and socket coupling for engaging and locking members having slight angular and axial misalignments.

Still another object of this invention is the provision of ball and socket apparatus in which the socket is slotted to accommodate a ribbed ball member to insure positive locking of the two members when rotated.

Other objects and advantages of this invention will hereinafter become more evident from the following description making reference to the accompanying drawing in which:

Fig. 1 is an elevation view in section of a socket constructed in accordance with the principles of this invention;

Fig. 2 is a view along 2—2 of Fig. 1; and

Fig. 3 is an elevation view in section of the modified ball member suitable for use with the socket of Fig. 1; and Fig. 4 is a view along 4—4 of Fig. 3.

Referring to the drawing wherein like numerals refer to like members throughout the several figures, there is shown in Figs. 1 and 2 a socket or female part 10 consisting of a hollow cylindrical member 12 having a conical inlet 14 at one end and a hollow cylindrical insert 16 at its opposite end.

Socket 10 is for use with a ball member or male part 11 to be later described with reference to Figs. 3 and 4. Insert 16 may be welded at 18 to cylinder 12 and is provided at its inner end with a spherical seat 22 carved out of an abutment 24. The latter also limits the placement of an extension shaft 26 which is shown inserted into cylindrical insert 16. Extension shaft 26, cylinder 12, and insert 16 are provided with transverse holes 28, 28' and 28", respectively, to accommodate the insertion of a pin 32 to insure the positive engagement of shaft 26 with socket 10 as shown. Shaft 26 may be the lower end of the drive mechanism (not shown). The engaging or receiving end of socket 10 having conical opening 14 is provided in this case with four axially extending slots 34 in a restricted throat section 36. Throat section 36 is provided with a spherical seat 38 along its inner surface which together with the spherical seat 22 in abutment 24 of sleeve 16 forms a cavity with spherical walls as indicated by double arrow A for accommodating ball member 11. A pair of stop pins 42 are located through the wall of cylindrical member 12 as illustrated in Fig. 2 to provide a limit upon the rotation of ball member 11 therein during the locking action to be later described, and for other purposes to be described below.

Ball member 11 as illustrated in Figs. 3 and 4 comprises a modified ball 52 connected by a neck 54 of narrow diameter to a shaft extension 56. Shaft extension 56 may be connected in convenient fashion to the member to be supported such as the top of control rod 58 indicated in phantom. Ball 52 is generally spherical in shape except that four sections are cut away as shown in Fig. 4 leaving in effect four spherically surfaced segments 58. Segments 58 are of such size and width as to be accommodated through slots 34 located in throat 36 of socket 10 shown in Fig. 1. It will be seen that the diameter of slots 34, that is, the dimension from valley to valley indicated by double arrow B is substantially larger than the outer diameter of ball 52 so to accommodate slight angular and axial misalignments of ball member 11 which may exist.

In utilizing the apparatus shown in the drawing to obtain the engagement and locking of a load such as control rod 58 to shaft extension 26 the latter is lowered down with socket member 11 with the conical opening 14 over modified ball 52. Socket 10 is oriented so that the slots 34 are lined up with segments 58. The conical shape of opening 14 will insure that ball 52 rides into slots 34 while the continued movement of socket 10 downwardly will cause, eventually, the outer surfaces of segments 58 to come to rest on the surface of spherical seat 22 on sleeve 16. When this occurs, socket 10 is rotated, for the particular construction shown here, in a clockwise direction as indicated by arrow C in Fig. 3 so that slots 34 are no longer aligned with segments 58 of ball 52. Stop pins 42 limit rotation of extension shaft 26 to approximately 50°. If shaft 26 does not stop at approximately 50°, it indicates that coupling has not been achieved. After socket 10 is rotated extension shaft 26 is raised thereby seating ball 52 on spherical seat 38 of throat 36. In effect the seats or surfaces 22 and 38 comprise a fully spherical seat for ball member 52 so that during the reciprocating movement of shaft 26 adjusting the position of control rod 58 slight misalignments of socket 10 and ball member 11 will not result in any binding or jamming. Furthermore, it is apparent that the engagement of socket 10 with ball member 11 is brought about without any visual aid whatsoever and that locking which occurred by the rotation of socket 10 was positive in nature and entirely safe. The cruciform shape of slots 34 and segments 58 of ball member 11 allow the coupling apparatus to be engaged in this case at 90° increments although it is understood that other suitable increments may be used. In addition to the axial freedom of movement which the two members 10 and 11 have with respect to each other it is seen that the location of stop pins 42 permits a certain amount of rotational freedom of the two parts with respect to each other which will prevent binding of the control rod in its guide slots (not shown). This permits some angular tolerance in the mounting of the control rods to the attached components. Of course, in addition, the spherical seat indicated by double arrow A maintains a constant bearing surface area regardless of the angular misalignments as is understood in the art, preserving this well known benefit of ball and socket construction.

Upon disconnect of the coupling, when shaft 26 is rotated counterclockwise, stop pins 42 stop socket 10 in proper alignment with ball 11 to facilitate disconnection without lifting control rod 58. After lifting shaft 26 a small distance, equal to the axial engagement of the ball and socket, free 360° rotation of shaft 26 will then indicate complete disconnect.

Locking of the coupling against rotation would be accomplished external of the coupling itself by guide slots for control rod 58 and pinned anti-rotational devices in the drive mechanism connected to shaft 26.

Thus, there has been provided a modified ball and socket coupling apparatus in which all of the known advantages of this type of coupling are combined with certain additional features making it applicable for the remote engagement of elements without visual aid and at the same time providing a high degree of flexibility in its utility as hereinbefore described. However, the foregoing disclosure relates only to a preferred embodiment of this invention and numerous modifications or alterations thereof may be made without departing from the spirit and scope of the invention as set forth in the appended claims.

I claim:
1. A ball and socket coupling comprising a ball member consisting of a hemispherical element with a plurality of sections removed to form a shaped cross-section transverse to the axis of engagement, a socket member for engagement with said ball member comprising a hollow cylinder with a narrow inlet throat at one end forming an entrance to said cylinder on one side of said throat and a spherical annular surface on the other side of said throat, said throat provided with slots shaped to accommodate said cross-section of said ball member, and a spherical seat formed within said cylinder facing said throat spherical surface and forming therewith a cavity having close fitting support bearing surfaces for the outer spherical surfaces of said ball member when inserted through said slots into said cylinder cavity.

2. The coupling of claim 1 in which there is provided stop means within said cavity to permit the limited rotation of said ball member within said cavity to insure bearing of the outer surfaces of said ball member on said cavity surfaces during use of said coupling.

3. A ball and socket coupling comprising a ball member consisting of a hemispherical element with four sections removed to form a cruciform cross-section transverse to the axis of engagement and a rigid element attached thereto at one end extending therefrom along the axis of engagement, a socket member for engagement with said ball member comprising a hollow cylinder with a narrow inlet throat at one end forming a conical entrance to said cylinder on one side of said throat inlet and a spherical annular surface on the other side of said throat, said throat provided with slots shaped to accommodate said cruciform cross-section of said ball member, a spherical seat formed within said cylinder facing said throat spherical surface and forming therewith a cavity having close fitting support bearing surfaces for the outer spherical surfaces of said ball member when inserted through said slots into said cylinder cavity, and stop means within said cavity to permit the limited rotation of said ball member within said cavity to insure bearing of the outer surfaces of said ball member on said cavity surfaces during use of said coupling.

4. A ball and socket coupling comprising a ball member consisting of a hemispherical element with four sections removed to form a cruciform cross section transverse to the axis of engagement and a rigid element attached thereto at one end and extending therefrom along the axis of engagement, a socket member for engagement with said ball member comprising a hollow cylinder with a narrow inlet throat at one end forming a conical entrance to said cylinder on one side of said throat, and a spherical surface on the other side of said throat, and said throat provided with slots to accommodate said cruciform cross section of said ball member, an insert within and integrally attached to said cylinder extending from the opposite end thereof having a spherical seat facing said throat and forming therewith a cavity having close fitting support bearing surfaces for the outer spherical surfaces of said ball member when inserted through said slots into said cylinder cavity, and stop means consisting of at least one pin extending through the cylinder wall adjacent one of said slots to permit the limited rotation of said ball member within said cavity to insure bearing of the outer surfaces of said ball member on said cavity surfaces during use of said coupling.

References Cited in the file of this patent

UNITED STATES PATENTS

| | | |
|---|---|---|
| 2,219,907 | Ross | Oct. 29, 1940 |
| 2,525,695 | Lombard | Oct. 10, 1950 |
| 2,671,682 | Page | Mar. 9, 1954 |